US011202233B2

(12) United States Patent
Lin et al.

(10) Patent No.: US 11,202,233 B2
(45) Date of Patent: Dec. 14, 2021

(54) METHODS AND SYSTEMS FOR DYNAMICALLY MANAGING QUALITY OF SERVICE ON TRANSPORTATION VEHICLES

(71) Applicant: Panasonic Avionics Corporation, Lake Forest, CA (US)

(72) Inventors: Changhwa Lin, Irvine, CA (US); Prasanna Padmanaban Mohanasundaram, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 65 days.

(21) Appl. No.: 16/867,378

(22) Filed: May 5, 2020

(65) Prior Publication Data

US 2021/0352533 A1 Nov. 11, 2021

(51) Int. Cl.

*H04W 28/20* (2009.01)
*H04L 12/927* (2013.01)
*B64D 11/00* (2006.01)
*H04W 28/24* (2009.01)

(52) U.S. Cl.

CPC ............. *H04W 28/20* (2013.01); *B64D 11/00* (2013.01); *H04L 47/805* (2013.01); *H04W 28/24* (2013.01)

(58) Field of Classification Search

None

See application file for complete search history.

(56) References Cited

U.S. PATENT DOCUMENTS 6,816,494 B1 11/2004 Raza
8,401,021 B2 3/2013 Buga et al.
2008/0240029 A1 10/2008 Lynch et al.
2011/0280125 A1* 11/2011 Jayakumar .......... H04L 47/2441 370/230
2015/0043335 A1* 2/2015 Testicioglu ............. H04L 47/24 370/230
2015/0043345 A1* 2/2015 Testicioglu ............. H04L 47/24 370/232
2016/0119938 A1 4/2016 Frerking et al.
2019/0327636 A1 10/2019 Dao

* cited by examiner

*Primary Examiner* — Kodzovi Acolatse
*Assistant Examiner* — The Hy Nguyen
(74) *Attorney, Agent, or Firm* — Klein, O'Neill & Singh, LLP

(57) ABSTRACT

Methods and systems are provided for a transportation vehicle. One method includes determining current available bandwidth rate based on network traffic generated by a plurality of devices and a plurality of traffic types on a transportation vehicle; utilizing a hierarchical tree structure to modify quality of service (QoS) that is indicated by a specific bandwidth rate associated with different priority levels, where each priority level is associated with one of the plurality of devices and the plurality of traffic types; and storing the modified QoS for the different priority levels at the hierarchical tree structure for a next update of the QoS when the current available bandwidth rate changes.

21 Claims, 10 Drawing Sheets

Start B422
Retrieve default priority levels B424
Traverse a bandwidth data structure to dynamically update QoS levels for different traffic types, based on the difference between the current available bandwidth and the available bandwidth B426
Store updated QoS levels for different traffic types B428
Utilize the stored QoS level for a next QoS update based on change of available bandwidth rate B430
B412

METHODS AND SYSTEMS FOR DYNAMICALLY MANAGING QUALITY OF SERVICE ON TRANSPORTATION VEHICLES

TECHNICAL FIELD

The present disclosure relates to transportation vehicles in general, and more particularly, to dynamically managing quality of service (QoS) for managing network bandwidth on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Network bandwidth is an important resource to access PEDs and IFE devices. However, managing QoS on transportation vehicles, e.g. aircrafts can be challenging. Aircrafts often receive guidance on available bandwidth from a ground station. However, the actual bandwidth on the aircraft maybe different than the guidance from the ground station. Continuous efforts are being made to develop networking technology for dynamically updating QoS on transportation vehicle based on current operating conditions.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
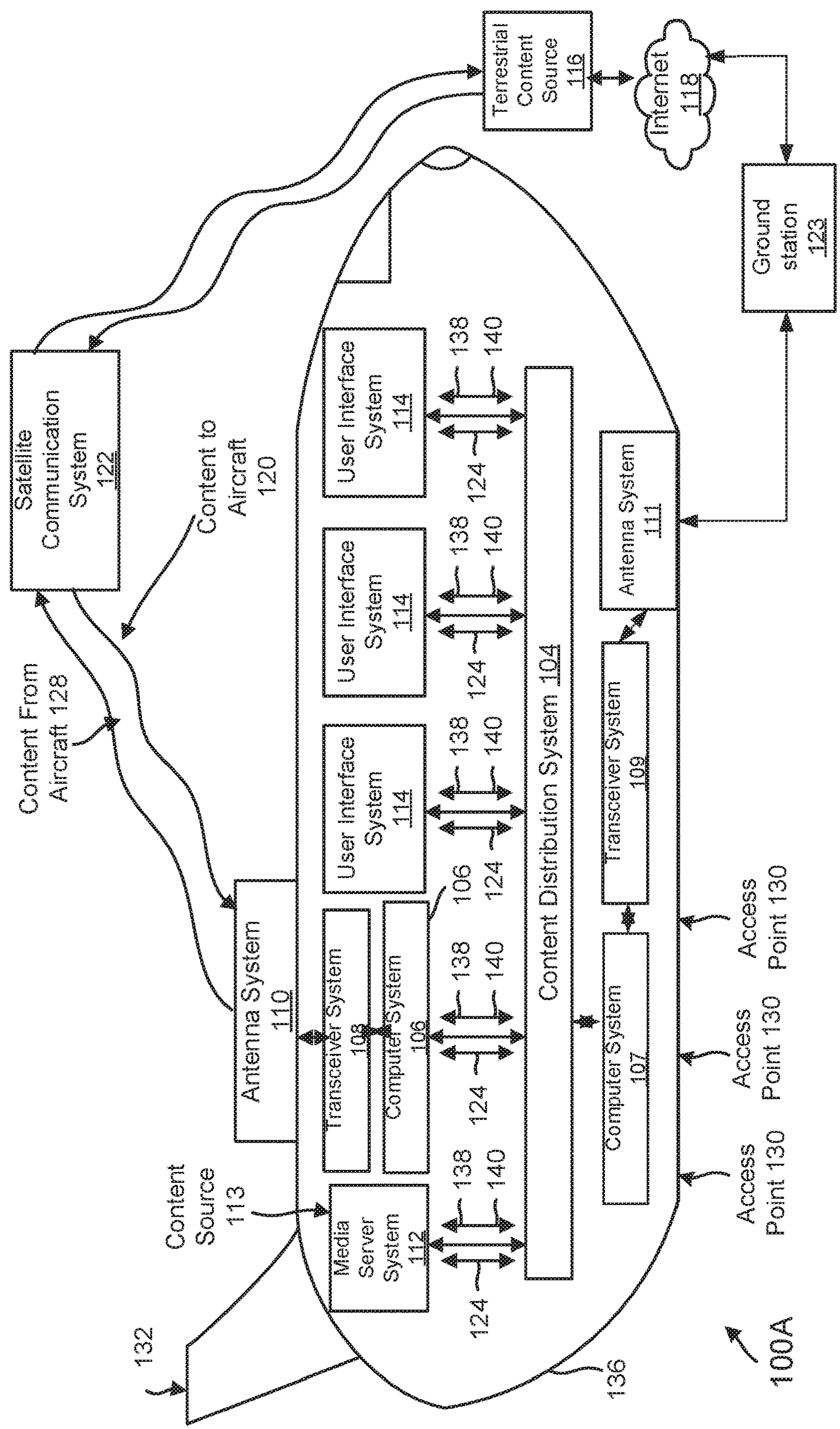
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132, according to one aspect of the present disclosure. In one aspect, as described below in detail, system 100A uses innovative computing technology of the present disclosure for dynamically updating quality of service (QoS) for providing network bandwidth on aircraft 132. The technology disclosed herein enables airlines to better manage network bandwidth that is available via satellite connectivity as well as via wireless connectivity via a cellular base station 123 (e.g., a cell phone tower).

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device/IFE device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or the cellular base station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a personal electronic device (PED) to receive and view content via an access point 130, described below in detail. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
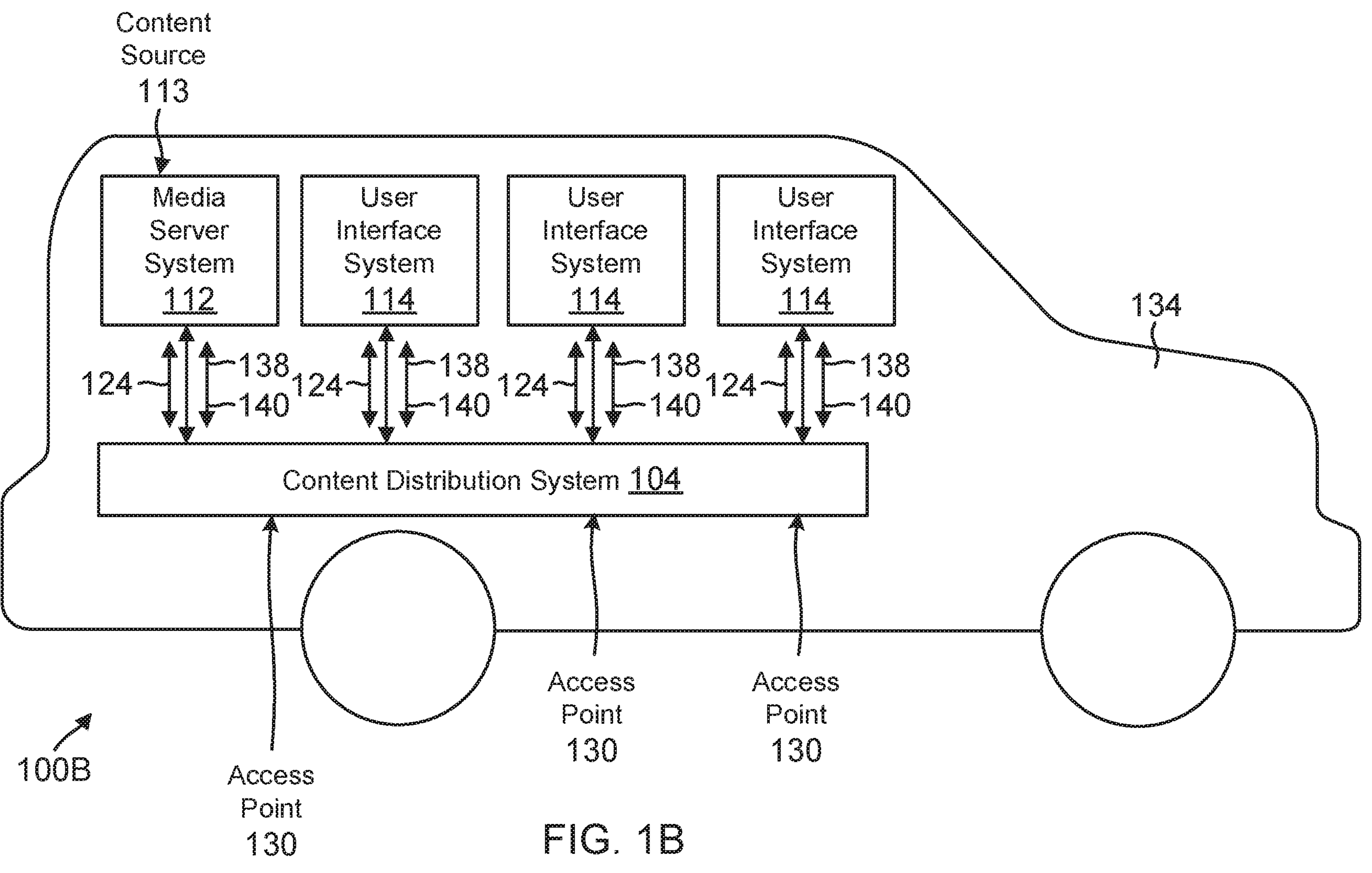
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Figure 2:
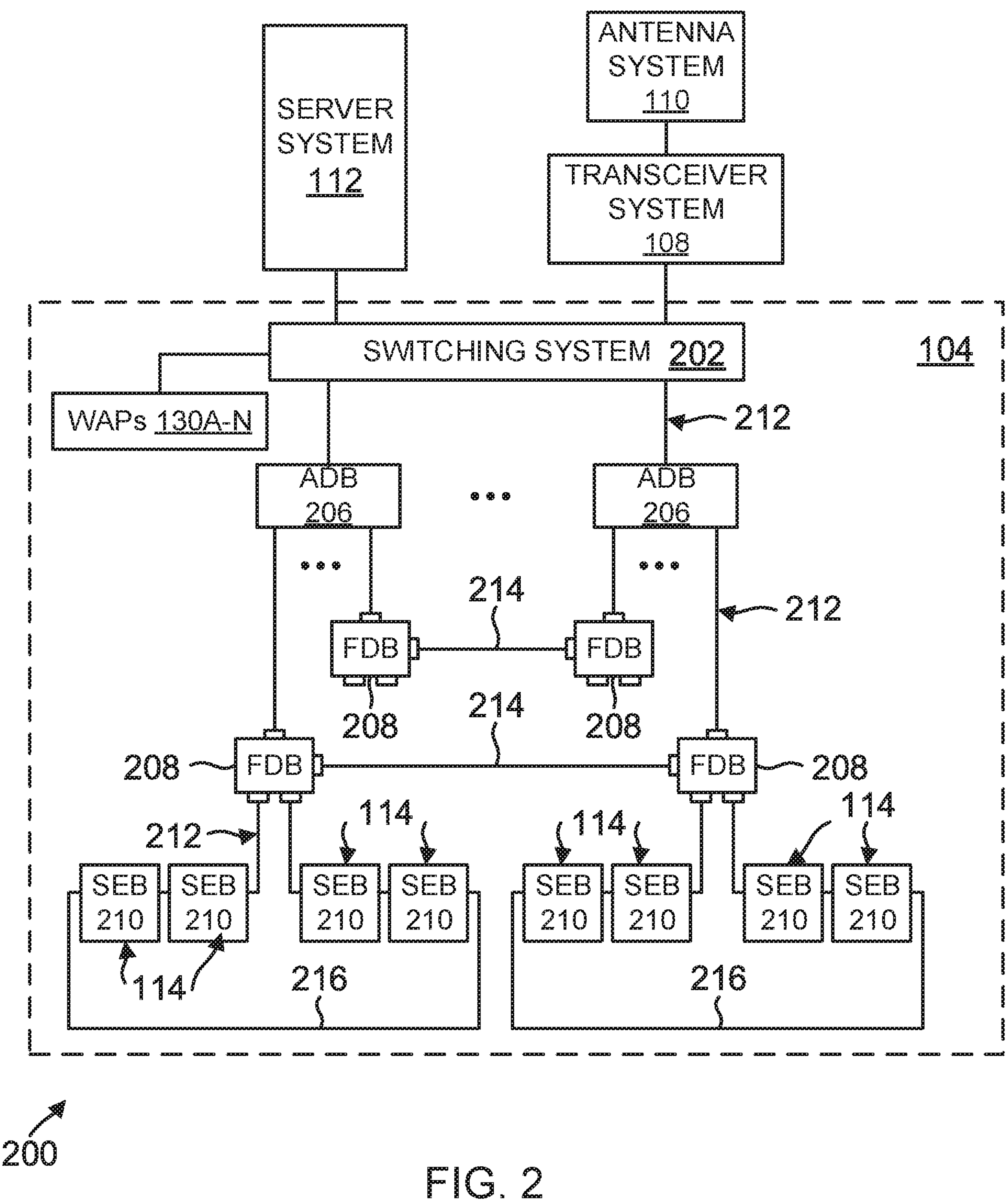
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
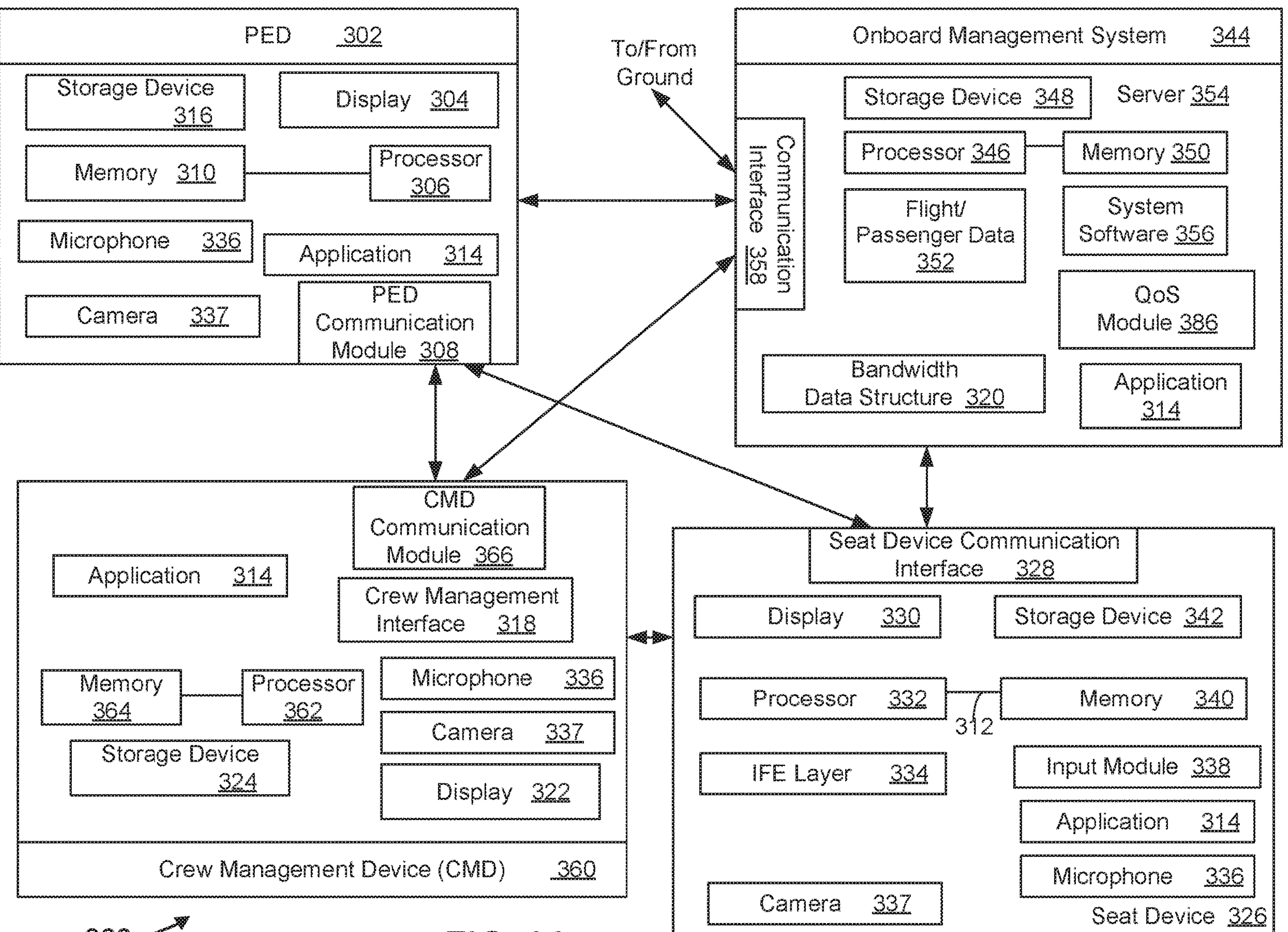
FIG. 3A shows an example of an overall system for distributing content on an aircraft, according to one aspect of the present disclosure.

System 300: FIG. 3A shows an example of a system 300 for dynamically managing QoS on an aircraft (or any other transportation vehicle), according to one aspect of the present disclosure. The QoS is managed by a QoS module 386 that can be executed by an onboard management system 344 described below in detail, or any other computing device on the aircraft.

In one aspect, system 300 includes, the onboard management system 344, at least a seat device 326, at least a PED 302, and at least a crew management device (may be referred to as "CMD") 360. In another aspect, system 300 may include the seat device 326 and the PED 302, the CMD 360 and the PED 302, the CMD 360 and the seat device 326.

In one aspect, the onboard management system 344 includes a server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, bandwidth data structure 320 (may also be referred to as data structure 320), media content, applications and program files, including system software 356, an application 314, the QoS module 386 (may also be referred to as module 386) and others. Module 386 includes program instructions to dynamically manage QoS on the aircraft using data structure 320, as described below in detail. It is noteworthy that module 386 may be executed from the seat device 326, the CMD 360 or any other device.

In one aspect, system software 356 is executed by the processor 346 to control the overall operation of the server 354. Application 314 may be downloaded from server 354 by passengers using an authorized PED 302 for accessing digital content.

In one aspect, the onboard management system 344 maintains flight and passenger data 352 (may also be referred to as data 352), for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with CMD 360, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, the seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and vides and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options to users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication. The bandwidth used by the communication interface 328 for accessing content is managed by module 386, as described below in detail.

In another aspect, the seat device 326 may also execute the application 314 that may be used by the passenger to view media content or various computing functions that are enabled by the seat device 326. The application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone 336 for receiving a voice input. CMD 360 may also include a camera 337 for taking pictures or making a video.

The CMD 360 may also include a storage device 324 that may be o may include any storage medium for storing data in a non-volatile manner, such as one or more magnetic or optical based disks, flash memory, or solid-state drive. The storage device 316 may be used to store a crew management interface (CMI) 318 that may be executed out of memory 364.

The CMI 318 enables the CMD 360 to interface with the onboard management system 344 via a CMD communication module 366. The CMD 360 may present one or more APIs to the management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards. The bandwidth available for the CMD communication module 366 is managed by module 386, as described below.

In one aspect, the PED 302 is paired with the seat device 326. The PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may include a microphone 336 for receiving a voice input from a passenger. The voice input is converted into text by an application 314 for processing. In another aspect, PED 302 also includes a camera 337 that may be used by a passenger to upload a video.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content and communicate with CMD 360.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards. The network bandwidth used by the PED communication module 308 is managed by module 386, as described below.

Figure 3B:
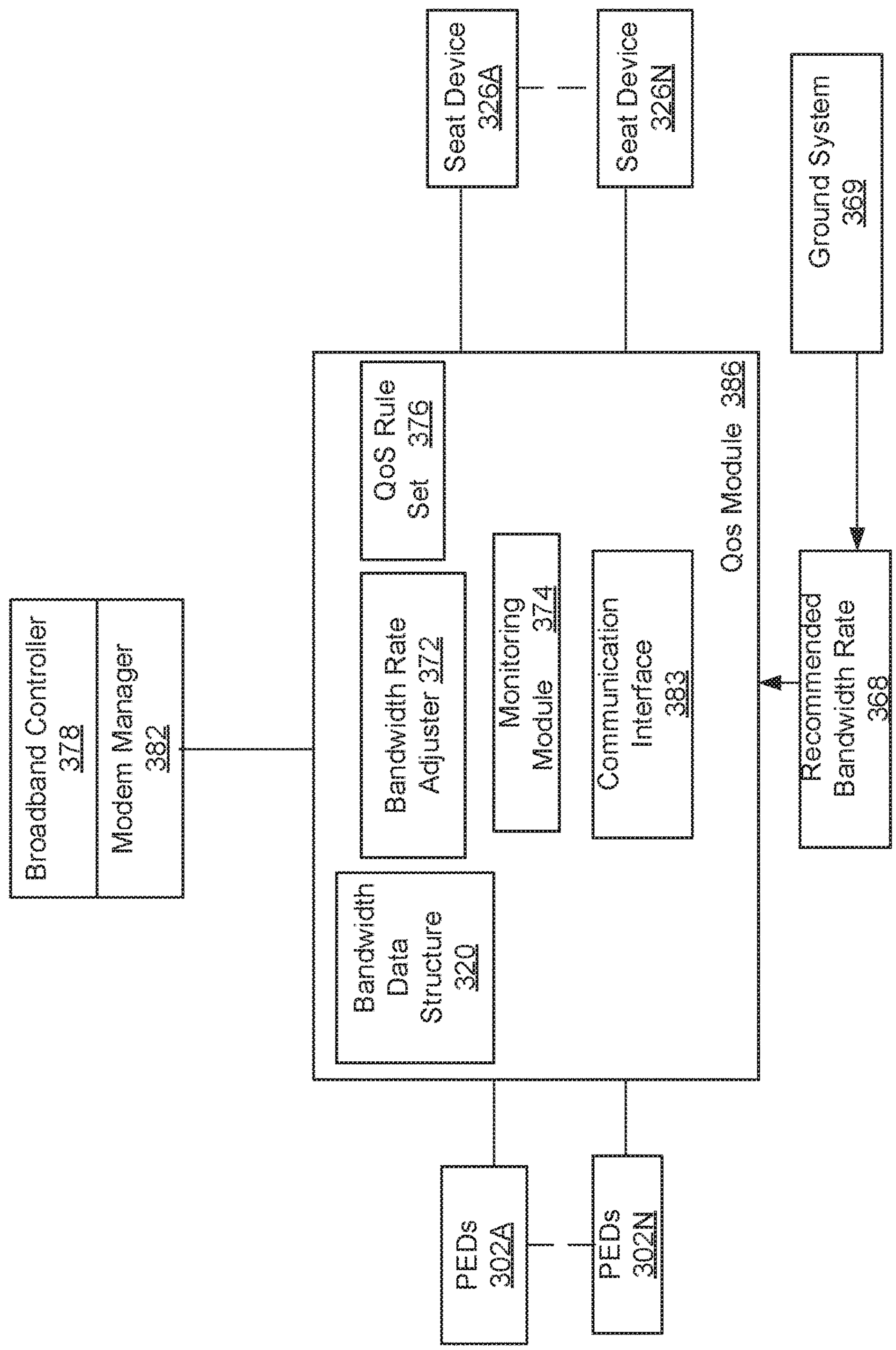
FIG. 3B shows a block diagram of a Quality of Service (QoS), according to one aspect of the present disclosure.

QoS Module 386: FIG. 3B shows an example of module 386 for dynamically managing bandwidth on an aircraft, according to one aspect of the present disclosure. The bandwidth is managed by assigning a certain QoS level for different priority levels associated with different traffic types. The QoS level indicates a bandwidth rate that is assigned to a specific traffic and/or device type on the aircraft. Module 386 includes a monitoring module 374 that receives information regarding network traffic, to and from, the PEDs 302A-302N (may also be referred to as PED 302 or PEDS 302) and seat devices 326A-326N (may also be referred to as seat device 326 or seat devices 326). The monitoring module 374 executes or uses a "sniffer" thread to detect network traffic to and from the PEDs 302 and seat devices 326. This provides the QoS module 386 with real-time bandwidth (i.e. "current bandwidth) that is used by PEDs 302 and seat devices 326, and detecting the number of PEDs and seat devices that have traffic flows for allocation of an upper bound of a fair-share bandwidth of a communication bandwidth (e.g., a real time bandwidth, a "current bandwidth").

Figure 4A:
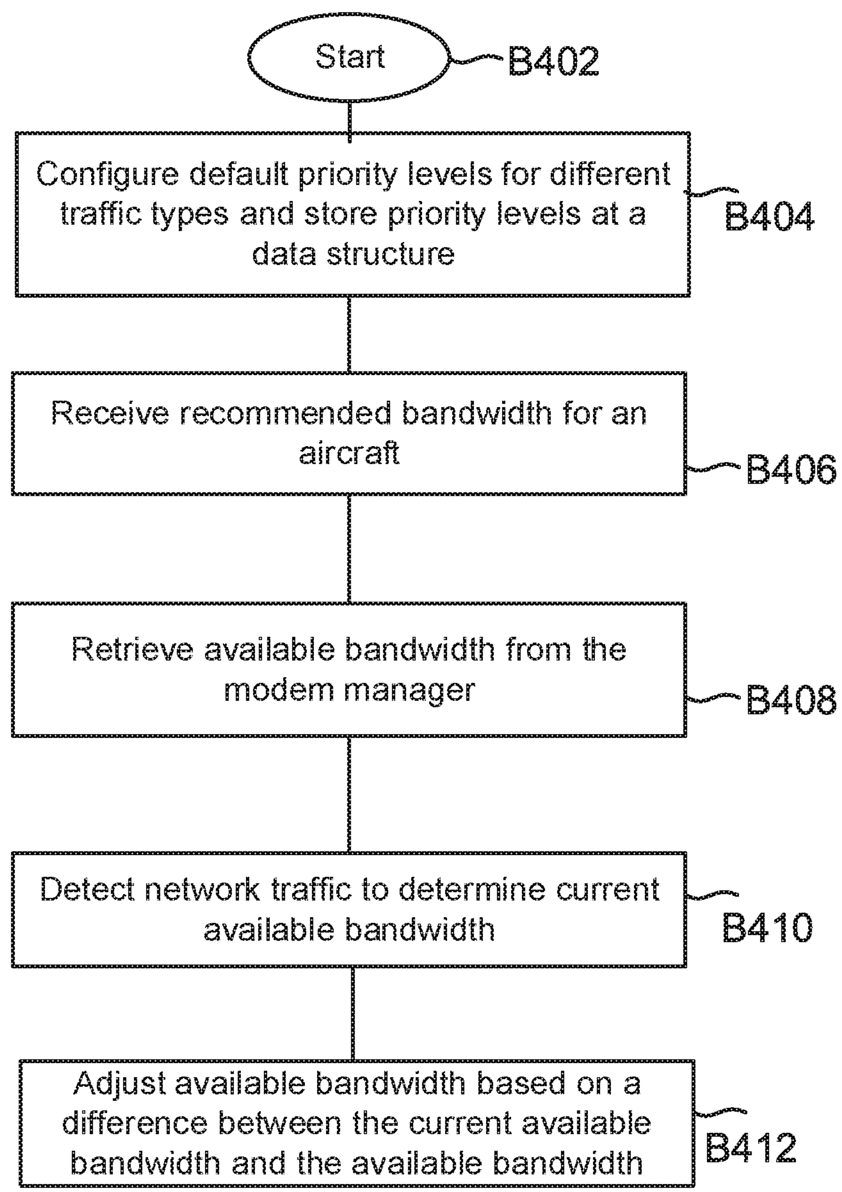
FIG. 4A shows a process flow diagram for dynamically managing QOS on an aircraft, according to one aspect of the present disclosure.

In one aspect, a ground computing system (shown as ground system) 369 provides a recommended bandwidth rate 368 for the aircraft. The ground system 369 determines this rate based on overall availability for a specific geographic area, the number of aircrafts that maybe present at a given time in the geographic area and a predicted cumulative bandwidth usage on each aircraft. The ground system 369 may use machine learning techniques to predict the recommended bandwidth 368. Module 386 also obtains an available bandwidth rate from a broadband controller 378. The broadband controller 378 interfaces with the transceiver system 108/109 and includes or interfaces with a modem manager 382. The modem manager 382 obtains information from the transceiver system 108/109 to determine an actual download and upload rate. This information is retrieved by module 386 by communicating with the modem manager 382 via the communication interface 383. The actual bandwidth rate based on information from the modem manager 382 and the current bandwidth rate based on actual network traffic is used by a bandwidth adjuster 372 to adjust QoS levels (i.e. assigned bandwidth rate) for different traffic types and/or devices on the aircraft. The bandwidth rate adjuster 372 uses a QoS rule set 376 for adjusting the QoS levels. In one aspect, the QoS rule set provides a priority level for different traffic and device types. For example, all traffic generated by the broadband controller 378 may be assigned the highest priority level of P1, below P1, all telemedicine related traffic to and from the aircraft is assigned a priority P2, all third party traffic (for example, sensors and instrumentation provided by a third party) is assigned a priority level, P3, below both P1 and P2. Point of sale (POS) traffic generated from POS devices on the aircraft is assigned a priority level P4, below P1, P2 and P3. All other user traffic is assigned a priority level P5, below P1, P2, P3 and P4. Data structure 320, as shown in FIG. 4C is used to track QoS levels and bandwidth allocation, as described below in detail. The bandwidth assigned to each priority level is fair-shared by all devices of the same priority level.

Process Flow: FIG. 4A shows a process 400 according to one aspect of the present disclosure. The various adaptive aspects of process 420 are described below with respect to an aircraft but are equally applicable on any transportation vehicle. Process 400 begins in block B402, when the transceiver systems 108/109 and the WAPs 130 have been installed on the aircrafts. The default QoS priority levels, e.g. P1-P5, mentioned above are defined and stored at QoS rule set 376 in block B404.

In block B406, a recommended bandwidth (e.g. 368, FIG. 3B) for the aircraft is received from the ground system 369. In block B408, module 386 retrieves the available bandwidth from the modem manager 382. The modem manager 382 provides this information based on communication system connection from transceiver system 108. In one example, a communication system connection includes a bandwidth assigned and a communication modulation used for allocation of a communication bandwidth.

In block B410, module 386 determines the current available bandwidth based on actual user traffic. If the current available bandwidth is different from the available bandwidth indicated by the modem manager 382, then in block B412, the bandwidth rate adjuster 372 using the data structure 320, adjusts the bandwidth levels for different traffic types. Details of block B412 are shown in FIG. 4B.

Process block B412 begins in block B422. In block B424, the bandwidth rate adjuster 362 retrieves the default priority levels from QoS rule set 376. In block B426, the data structure 320 is traversed to update the assigned bandwidth rate, based on different priority levels. The updated priority levels are stored in block B428 and are utilized for a next QoS level update at block B430.

Figure 4B:
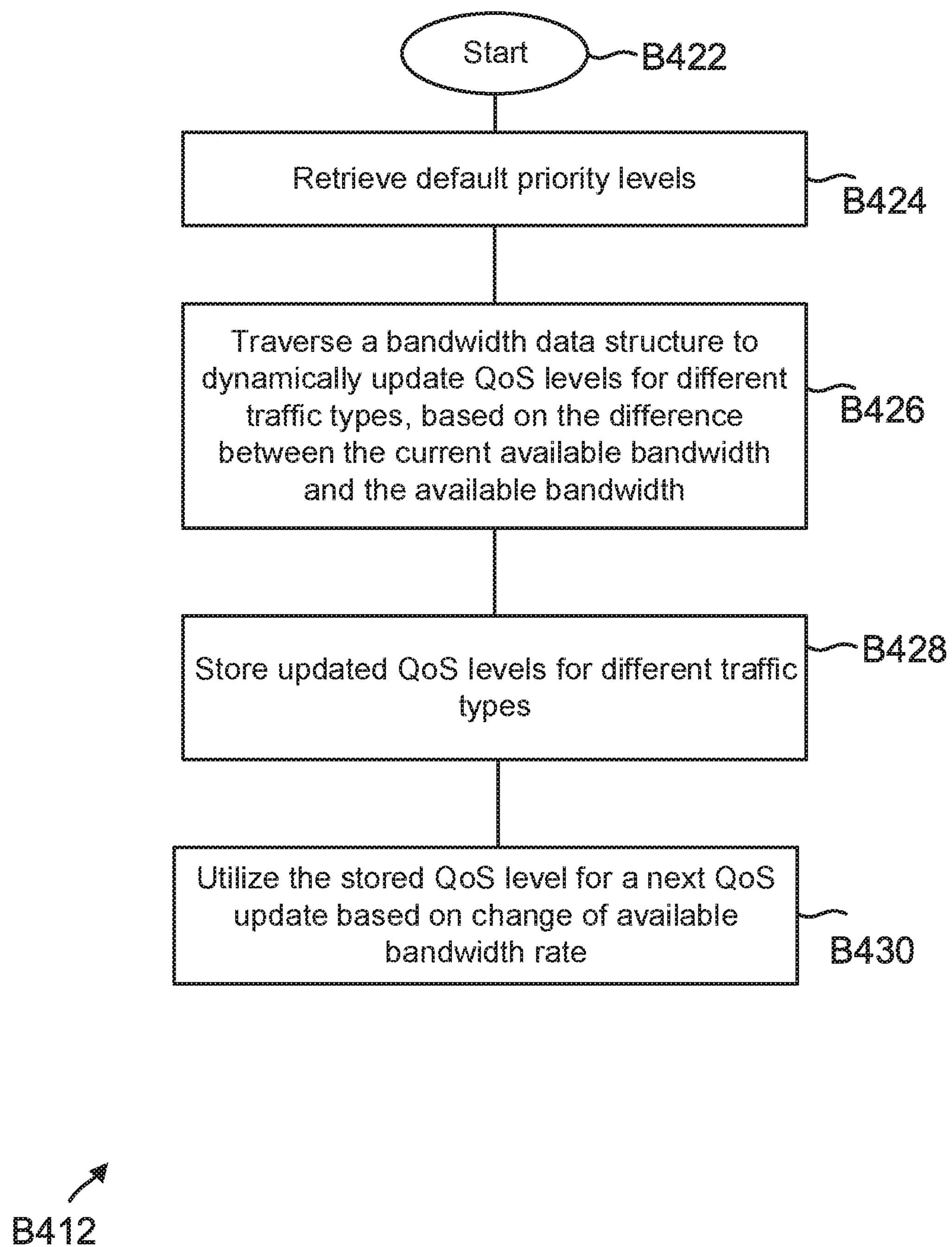
FIG. 4B shows a process flow diagram for adjusting bandwidth rate using a hierarchical tree structure, according to one aspect of the present disclosure.
Figure 4C:
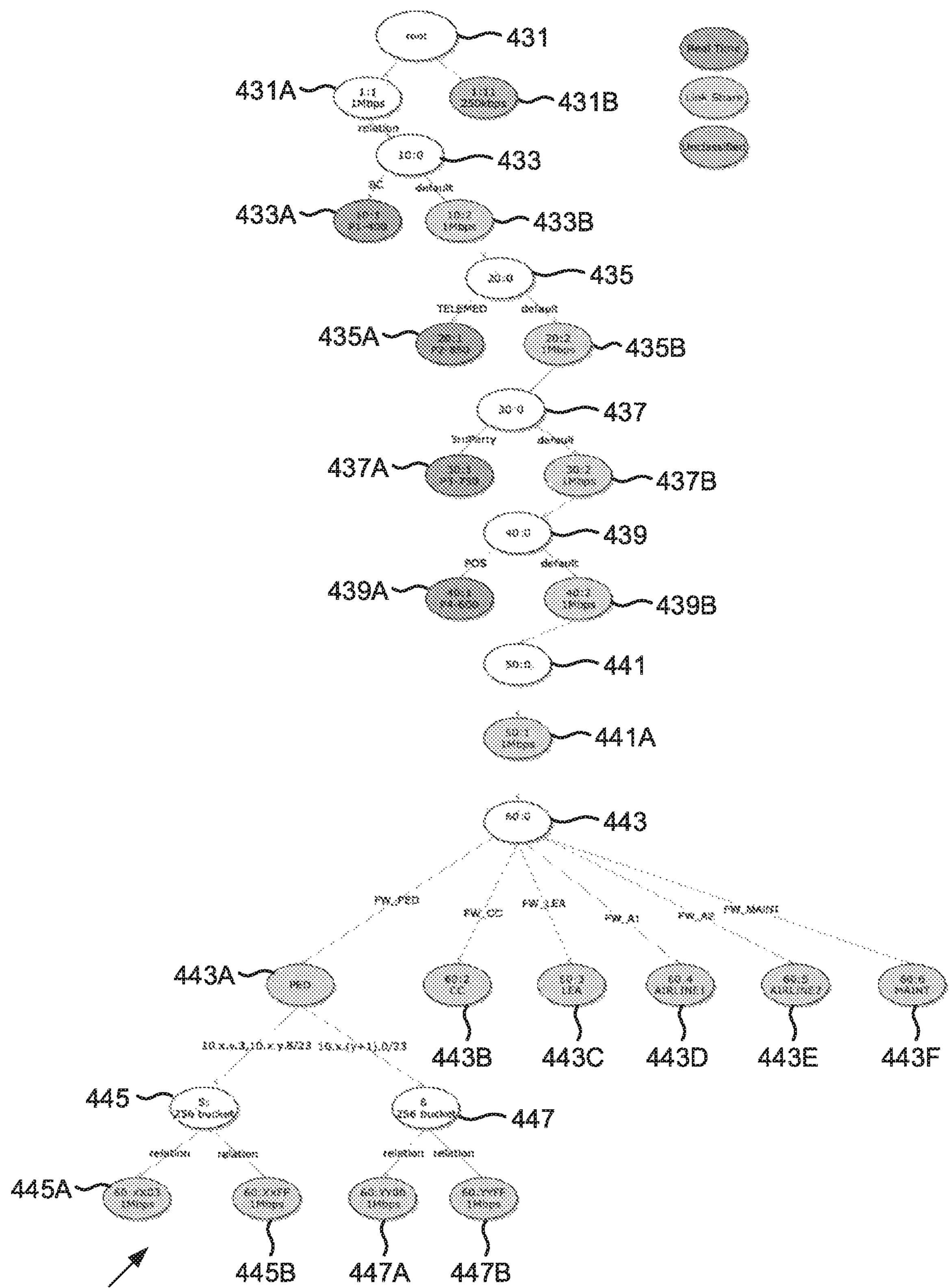
FIG. 4C shows an example of the hierarchical tree structure, according to one aspect of the present disclosure.

FIG. 4C shows an example, of using data structure 320 in block B426 of FIG. 4B. The data structure 320 is a hierarchical tree structure with a plurality of nodes. The nodes are used to allocate and track bandwidth rates for different priority levels. As an example, the data structure 320 includes a root node 431 with child nodes 431A and 431B. The child node 431B indicates that 250 kbps (kilobytes per second) maybe reserved for unclassified traffic. The child node 431A indicates that 1 Mbps (megabits per second) is the total available bandwidth at any given time. The child node 431A is associated with node 433 that is used to allocate/track the 400 kbps assigned to a priority level, P1 (e.g. for traffic, i.e., broadband traffic, primary traffic, e.g., like DNS). If the allocated bandwidth for P1 is not used, then the child node 433B indicates that 1 Mbps is available for allocation.

The child node 433B is associated with a node 435 that is used to allocate bandwidth (e.g. 850 kpbs) to the priority level, P2 (e.g. for telemedicine related traffic) using the child node 435A. Node 435 is also associated with the child node 435B to indicate that the allocated bandwidth for the P2 level may not be used entirely.

The child node 435B is associated node 437 to allocate bandwidth for the priority level, P3 (e.g. for third party traffic). A child node 437A, associated with node 437 indicates the allocated bandwidth for the P3 level. Node 437 is also associated with a child node 437B to indicate that the bandwidth for the P3 level is not used entirely.

The child node 437B is associated with a node 439 to allocate bandwidth for the priority level, P4 (e.g. POS traffic) via the child node 439A that is associated with the node 439. The child node 439B indicates that the bandwidth for priority level P4 is unused and may be allocated to other devices via nodes 441/441A and node 443.

Node 443 is associated with the child node 443A to allocate unused bandwidth for one or more PEDS. The bandwidth is allocated using node 445 and the associated child nodes 445A/445B, and node 447 and the associated child nodes 447A/447B. The bandwidth allocated to node 443A is fair-shared assigned to nodes 445A/445B/447A/447B of the same priority level.

Node 443 is also associated with a child node 443B that is used to allocate bandwidth for cabin crew (CC) member device traffic. Node 443 is further associated with a child node 443C that is used to allocate bandwidth for law enforcement agency (LEA). Node 443 is associated with child nodes 443D and 443E that are used to allocate bandwidth to airline devices. The child node 443F is used to allocate bandwidth for a maintenance terminal.

Figure 4D:
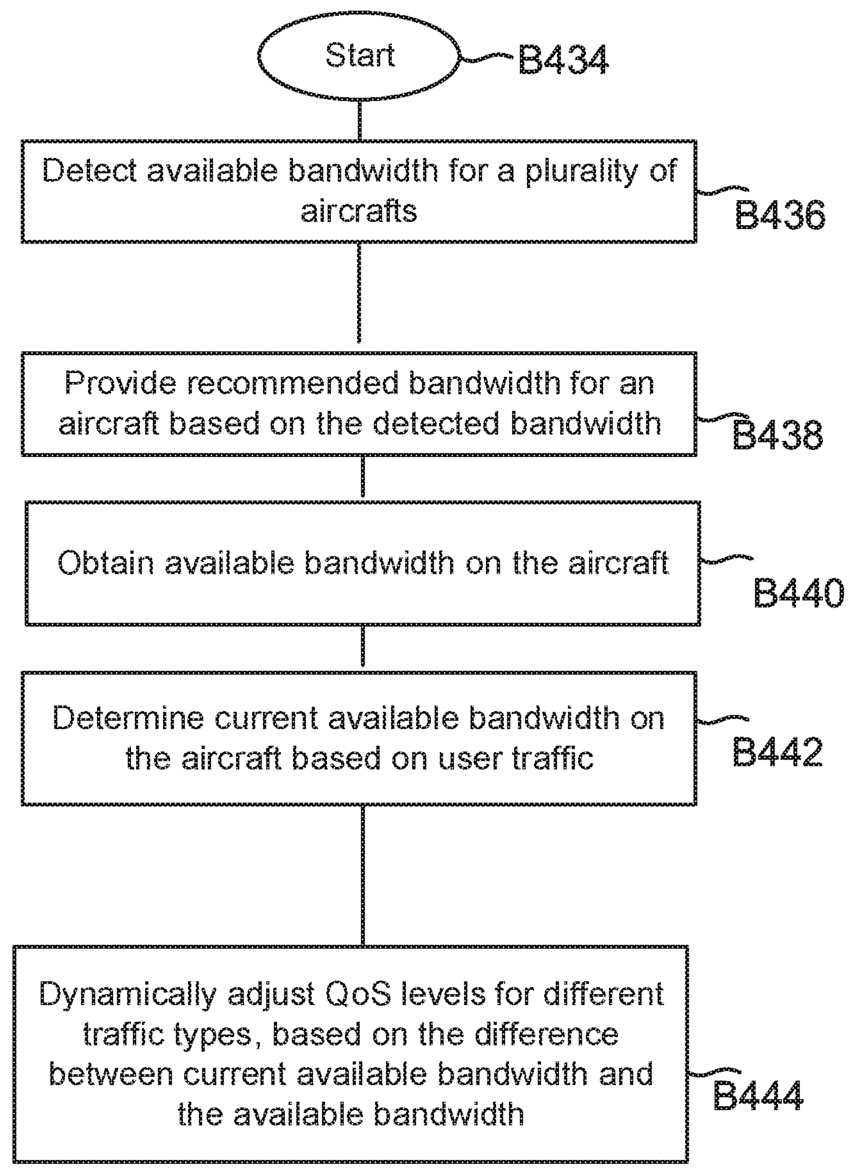
FIG. 4D shows an example of yet another process flow for dynamically managing QoS on an aircraft, according to one aspect of the present disclosure.

FIG. 4D shows yet another process 432 for dynamically managing QoS for different devices and traffic types on an aircraft using data structure 320 described above, according to one aspect of the present disclosure. Process 432 begins in block B434, after the QoS rule set 376 (FIG. 3B) has been configured and stored. A ground computing device (e.g. 369, FIG. 3B) detects the available bandwidth for a plurality of aircrafts within a certain geographical region. The ground computing device 369 uses machine learning tools to identify the bandwidth that may be used by each aircraft. For example, the ground computing device stores aircraft configuration information that indicates the type of devices the aircraft may have, typical user traffic based on the aircraft's geographical location or any other factor. The ground computing system then provides recommended bandwidth rate 368 to each aircraft in block B438.

In block B440, the QoS manager 386 obtains available bandwidth from the modem manager 382, as described above. In block B442, the current available bandwidth is determined based on user traffic. If the current available bandwidth is different from the available bandwidth determined in block B440, then in block B444, data structure 320 is traversed and the bandwidth rate is adjusted for the various priority levels, as described above with respect to FIG. 4C.

In one aspect, the present disclosure provides networking technology for better managing bandwidth and QoS levels on an aircraft and other transportation vehicles. The QoS levels are changed dynamically to accommodate real-time traffic network needs.

Methods and systems are provided for a transportation vehicle. One method includes determining current available bandwidth rate based on network traffic generated by a plurality of devices and a plurality of traffic types on a transportation vehicle; utilizing a hierarchical tree structure to modify quality of service (QoS) that is indicated by a specific bandwidth rate associated with different priority levels, where each priority level is associated with one of the plurality of devices and the plurality of traffic types; and storing the modified QoS for the different priority levels at the hierarchical tree structure for a next update of the QoS when the current available bandwidth rate changes.

In another aspect, a method includes retrieving available bandwidth rate for a plurality of devices and a plurality of traffic types on an aircraft; determining current available bandwidth rate based on network traffic generated by the plurality of devices and the plurality of traffic types; traversing a hierarchical tree structure to modify quality of service (QoS) that is indicated by a specific bandwidth rate associated with different priority levels, where each priority level is associated with one of the plurality of devices and the plurality of traffic types; and storing the modified QoS for the different priority levels at the hierarchical tree structure for a next update of the QoS when the current available bandwidth rate changes.

Figure 5:
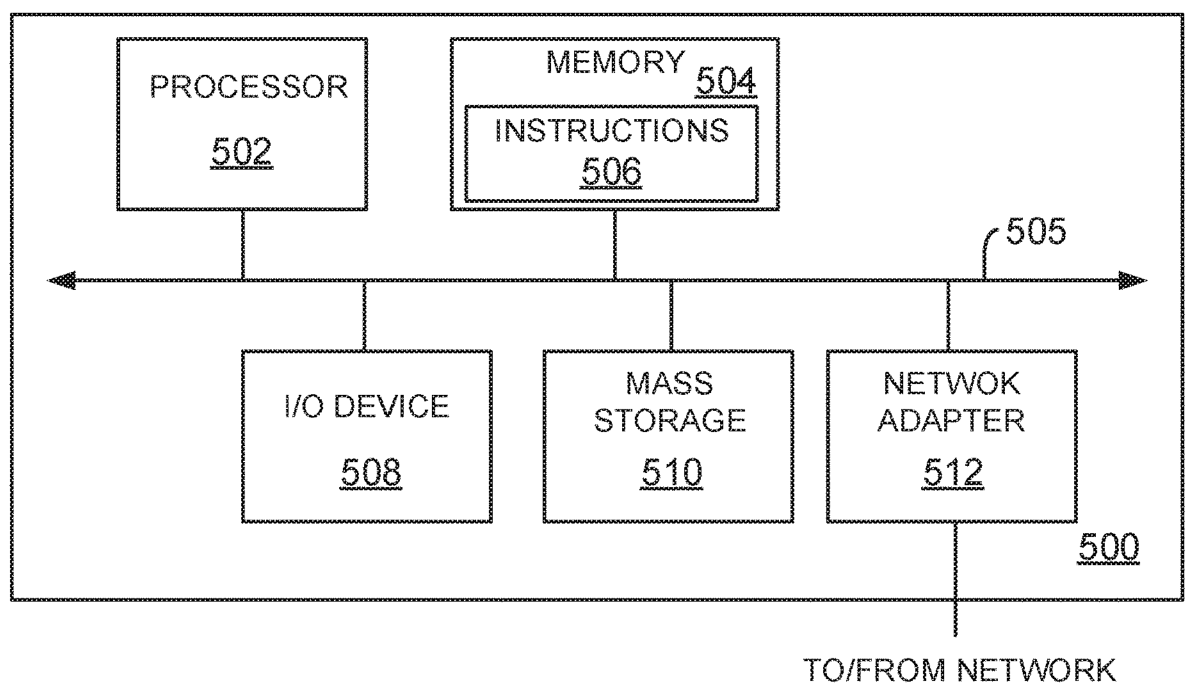
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent a ground system 369, CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement module 386, data structure 320 and 382 and/or the process steps of FIGS. 4A-4C described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for dynamically managing QoS levels on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

retrieving available bandwidth rate for a plurality of devices and a plurality of traffic types on an aircraft;

determining current available bandwidth rate based on a communication system connection, network traffic generated by the plurality of devices and the plurality of traffic types;

traversing a hierarchical tree structure to modify quality of service (QoS) that is indicated by a specific bandwidth rate associated with different priority levels, where each priority level is associated with one of the plurality of devices and the plurality of traffic types;

assign a fair-share bandwidth to each active device of a same priority level; and storing the modified QoS for the different priority levels at the hierarchical tree structure for a next update of the QoS in response to the current available bandwidth rate changes.

2. The method of claim 1, wherein a first priority level is associated with traffic generated by a broadband controller that manages network traffic on the aircraft.

3. The method of claim 1, wherein a second priority level is associated with telemedicine traffic to, and from the aircraft.

4. The method of claim 1, wherein a third priority level is associated with network traffic from a crew member device on the aircraft.

5. The method of claim 1, wherein the fourth priority level is associated with traffic generated by a point of sale (POS) device on the aircraft.

6. The method of claim 1, wherein the different priority levels are stored in a rule set that is used to populate the specific bandwidth rate for each priority level in the hierarchical tree structure.

7. The method of claim 1, wherein a ground computing device provides a recommended available bandwidth to the aircraft and the recommended available bandwidth is used to initially configure the hierarchical tree structure.

8. A method, comprising:

determining current available bandwidth rate based on network traffic generated by a plurality of devices and a plurality of traffic types on a transportation vehicle;

utilizing a hierarchical tree structure to modify quality of service (QoS) that is indicated by a specific bandwidth rate associated with different priority levels, where each priority level is associated with one of the plurality of devices and the plurality of traffic types and provide a fair-share bandwidth allocation on each device for a same priority level; and storing the modified QoS for the different priority levels at the hierarchical tree structure for a next update of the QoS in response to the current available bandwidth rate changes.

9. The method of claim 8, wherein the transportation vehicle is an aircraft and a first priority level is associated with traffic generated by a broadband controller that manages network traffic on the aircraft.

10. The method of claim 9, wherein the second priority level is associated with telemedicine traffic to, and from the aircraft.

11. The method of claim 9, wherein the third priority level is associated with traffic generated by a point of sale (POS) device on the aircraft.

12. The method of claim 9, wherein a fourth priority level is associated with network traffic from a crew member device on the aircraft.

13. The method of claim 9, wherein a fifth priority level below crew member is associated with network traffic from passenger devices on the aircraft.

14. The method of claim 8, wherein the different priority levels are stored in a rule set that is used to populate the specific bandwidth rate for each priority level in the hierarchical tree structure.

15. The method of claim 8, wherein the transportation vehicle is selected from one of a train, a bus or a recreational vehicle.

16. A non-transitory machine-readable medium having stored thereon instructions for performing a method comprising machine executable code which when executed by at least one machine, causes the machine to:

retrieve available bandwidth rate for a plurality of devices and a plurality of traffic types on an aircraft;

determining current available bandwidth rate based on network traffic generated by the plurality of devices and the plurality of traffic types;

traverse a hierarchical tree structure to modify quality of service (QoS) that is indicated by a specific bandwidth rate associated with different priority levels, where each priority level is associated with one of the plurality of devices and the plurality of traffic types; and store the modified QoS for the different priority levels at the hierarchical tree structure for a next update of the QoS in response to the current available bandwidth rate changes.

17. The non-transitory machine-readable medium of claim 16, wherein a first priority level is associated with traffic generated by a broadband controller that manages network traffic on the aircraft.

18. The non-transitory machine-readable medium of claim 16, wherein a second priority level is associated with telemedicine traffic to, and from the aircraft.

19. The non-transitory machine-readable medium of claim 16, wherein a third priority level is associated with network traffic from a crew member device on the aircraft.

20. The non-transitory machine-readable medium of claim 16, wherein the fourth priority level is associated with traffic generated by a point of sale (POS) device on the aircraft.

21. The non-transitory machine-readable medium of claim 16, wherein the different priority levels are stored in a rule set that is used to populate the specific bandwidth rate for each priority level in the hierarchical tree structure.

* * * * *